(12) United States Patent
Yamamoto

(10) Patent No.: US 8,300,253 B2
(45) Date of Patent: *Oct. 30, 2012

(54) IMAGE FORMING APPARATUS, METHOD OF CONTROLLING IMAGE FORMING APPARATUS, AND MEMORY MEDIUM FOR STORING COMPUTER PROGRAM FOR EXECUTING METHOD, WITH INTERPRETER FOR CONTROL PROGRAMS THAT ARE PROVIDED FOR EXECUTION ON OS-INDEPENDENT PLATFORM

(75) Inventor: Masahito Yamamoto, Tokyo (JP)

(73) Assignee: Canon Kabushika Kaisha, Tokyo (JP)

( * ) Notice: Subject to any disclaimer, the term of this patent is extended or adjusted under 35 U.S.C. 154(b) by 40 days.

This patent is subject to a terminal disclaimer.

(21) Appl. No.: 12/546,736

(22) Filed: Aug. 25, 2009

(65) Prior Publication Data

US 2009/0316207 A1    Dec. 24, 2009

Related U.S. Application Data

(62) Division of application No. 11/768,389, filed on Jun. 26, 2007, now Pat. No. 7,633,643, which is a division of application No. 10/727,621, filed on Dec. 5, 2003, now Pat. No. 7,259,883, which is a division of application No. 09/274,334, filed on Mar. 23, 1999, now Pat. No. 6,747,753.

(30) Foreign Application Priority Data

Mar. 27, 1998 (JP) .................................. 10-080090

(51) Int. Cl.
*G06F 3/12* (2006.01)
*G06K 15/00* (2006.01)

(52) U.S. Cl. ..................................... 358/1.15; 358/1.13

(58) Field of Classification Search ................... 358/1.1, 358/1.8, 1.9, 1.12, 1.13, 1.15, 402, 448, 474
See application file for complete search history.

(56) References Cited

U.S. PATENT DOCUMENTS 4,724,521 A    2/1988  Carron et al. ................. 717/175
(Continued)

FOREIGN PATENT DOCUMENTS

EP    0 634 719 A2    1/1995
(Continued)

OTHER PUBLICATIONS

Apr. 8, 2008 Japanese Official Action in Japanese Patent Appln. No. 10-080090 (with translation).
(Continued)

*Primary Examiner* — Gabriel Garcia
(74) *Attorney, Agent, or Firm* — Fitzpatrick, Cella, Harper & Scinto

(57) ABSTRACT

An image processing apparatus including: an interpreter unit configured to interpret control programs including a command train represented in byte codes, the control programs being provided for execution on an OS-independent platform and each being an object provided in an object-oriented paradigm; a memory unit configured to store predetermined function programs for controlling a function of the image processing apparatus, the function programs being defined as an interface between the control programs and a device driver program for controlling the function and being used commonly by the control programs, the device driver program operating a hardware resource unit that includes at least one of a printing unit and an image pickup unit; and an execution unit configured to execute the device driver program using the function programs stored in the memory unit in accordance with the interpretation of the control programs by the interpreter unit.

5 Claims, 9 Drawing Sheets

U.S. PATENT DOCUMENTS

| | | | |
|---|---|---|---|
| 4,961,133 A | 10/1990 | Talati et al. | 364/200 |
| 5,065,343 A | 11/1991 | Inoue | 345/558 |
| 5,365,606 A | 11/1994 | Brocker et al. | 395/650 |
| 5,367,626 A | 11/1994 | Morioka et al. | |
| 5,390,247 A | 2/1995 | Fischer | |
| 5,510,896 A | 4/1996 | Wafler | |
| 5,603,031 A | 2/1997 | White et al. | 395/683 |
| 5,604,600 A | 2/1997 | Webster | |
| 5,625,757 A | 4/1997 | Kageyama et al. | 395/113 |
| 5,664,074 A | 9/1997 | Kageyama et al. | 358/1.14 |
| 5,671,345 A | 9/1997 | Lhotak | |
| 5,710,635 A | 1/1998 | Webster et al. | |
| 5,712,971 A | 1/1998 | Stanfill et al. | 714/34 |
| 5,726,883 A | 3/1998 | Levine et al. | |
| 5,752,079 A | 5/1998 | Melen et al. | |
| 5,768,483 A | 6/1998 | Maniwa et al. | 358/1.15 |
| 5,859,956 A | 1/1999 | Sugiyama et al. | |
| 5,892,900 A | 4/1999 | Ginter et al. | 395/186 |
| 5,987,463 A | 11/1999 | Draaijer et al. | 707/10 |
| 6,108,717 A | 8/2000 | Kimura et al. | 710/8 |
| 6,236,997 B1 | 5/2001 | Bodamer et al. | 707/10 |
| 6,288,799 B1 | 9/2001 | Sekiguchi | |
| 6,665,081 B1 | 12/2003 | Suzuki et al. | |
| 6,747,753 B1 | 6/2004 | Yamamoto | 358/1.15 |
| 7,054,899 B1 | 5/2006 | Yamamoto | 709/202 |
| 7,133,141 B1* | 11/2006 | Abi-Saleh | 358/1.13 |
| 2010/0208302 A1 | 8/2010 | Lee | |

FOREIGN PATENT DOCUMENTS

| | | |
|---|---|---|
| EP | 0 751 651 A2 | 1/1997 |
| EP | 0 778 514 A1 | 6/1997 |
| EP | 0 778 515 A1 | 6/1997 |
| EP | 0 800 134 A2 | 10/1997 |
| EP | 0 820 004 A1 | 1/1998 |
| EP | 0 893 753 A2 | 1/1999 |
| EP | 0 982 650 B1 | 10/2004 |
| JP | 06-149756 | 5/1994 |
| JP | 6-295286 | 10/1994 |
| JP | 7-64802 | 3/1995 |
| JP | 07-250205 | 9/1995 |
| JP | 07-271702 | 10/1995 |
| JP | 8-30512 | 2/1996 |
| JP | 08-055069 | 2/1996 |
| JP | 8-154147 A | 6/1996 |
| JP | 8-185288 A | 7/1996 |
| JP | 8-263233 | 10/1996 |
| JP | 08-272559 A | 10/1996 |
| JP | 8-289068 A | 11/1996 |
| JP | 8-289102 A | 11/1996 |
| JP | 8-314770 | 11/1996 |
| JP | 9-163064 A | 6/1997 |
| JP | 9-179711 A | 7/1997 |
| JP | 9-179801 A | 7/1997 |
| JP | 9-224097 A | 8/1997 |
| JP | 9-238222 A | 9/1997 |
| JP | 9-263019 A | 10/1997 |
| JP | 9-282154 A | 10/1997 |
| JP | 9-325928 A | 12/1997 |
| JP | 9-330260 | 12/1997 |
| JP | 9-330385 A | 12/1997 |
| JP | 10-40031 A | 2/1998 |
| JP | 10-044561 A | 2/1998 |
| JP | 11-73381 | 3/1999 |
| JP | 11-282684 A | 10/1999 |
| JP | 2006-48725 A | 2/2006 |
| JP | 4154416 A | 9/2008 |
| JP | 2008-312204 A | 12/2008 |
| WO | 97/36226 A | 10/1997 |
| WO | 97/43720 A | 11/1997 |
| WO | 98/14888 A1 | 4/1998 |

OTHER PUBLICATIONS

May 20, 2008 Japanese Official Action in Japanese Patent Appln. No. 2005-23591 (with partial translation).

Mar. 17, 2009 Japanese Official Action in Japanese Patent Appln. No. 10-080090 (with translation).

Iida, et al., "2. Mobile Agents and Network Applications", Journal of JPSJ, Jan. 15, 1997, vol. 38, No. 1, pp. 17-23.

"Column—Agent Technology: 'Acting Object', the Key to Sophisticated Use of Internet", Nikkei Byte, Feb. 22, 1998, No. 175, pp. 224-229.

"Communication Language 'Telescript'—Major Companies Break in Aiming at Industry Standard", Nikkei Communications, May 16, 1994, No. 174, pp. 52-58.

Feb. 11, 2010 European Search Report in European Patent Appln. No. 09169284.8.

Feb. 11, 2010 European Search Report in European Patent Appln. No. 09169285.5.

Aug. 19, 2009 Japanese Official Action in Japanese Patent Appln. No. 2009-106549.

Nov. 17, 2009 Japanese Official Action in Japanese Patent Appln. No. 2009-106549.

Akihiko Miyoshi, et al., Real-Time Extension of Java, Technical Report of the Institute of Information Processing "System Software and Operating System", The Institute of Information Processing of Japan, Jun. 5, 1997, vol. 97, No. 56, pp. 67-72, 97-OS-75-12.

Mamoru Harada, et al., Rushed into Digital Consumer Appliances, Part 2, Nikkei Electronics, Japan, Nikkei BP Corporation, Mar. 23, 1998, No. 712, pp. 147-158.

Akihiko Miyoshi, et al., Real-Time Extension of Java, Technical Report of the Institute of Electronics, Information and Communication Engineers, "Computer System", The Institute of Electronics, Information and Communication Engineers of Japan, Jun. 6, 1997, vol. 97, No. 87, pp. 13-18, CPSY97-27.

Akio Hoshi, Nikkei Java Review, Nikkei Open System, Japan, Nikkei BP Corporation, Dec. 15, 1997, No. 57, pp. 282-283.

CORBA/IIOP and Distributed Object Computing, TRON Association Developed Embedded OS Specifications, "JTRON" and Blended "Java" into "ITRON", Computopia, Japan, Computer Age Corporation, Apr. 1, 1998, vol. 33, No. 379.

Tsuyano Shoda, Java Programming Course Which Can Be Enjoyed by the Beginner, Java Horse Billionaire, No. 11, Windows Start, Japan, Mainichi Communications, Sep. 29, vol. 2, No. 123, pp. 218-220.

Taku Harada, et al., Challenge!! Java, Introduction Course of Java Language which is learned from the Fundamentals, Basic Using Method of the Threads, TRY! PC, Japan, CQ Publishing, Oct. 1, 1997, vol. 9, No. 10, pp. 162-170.

Jul. 21, 2009 Japanese Official Action in Japanese Patent Appln. No. 10-080090 (w/ translation).

Tadachika Ozono, et al., "On Constraint Logic Programming Language RXF for Implementing Multiagent Systems", Journal of IPSJ, Oct. 15, 1996, vol. 37, No. 10, pp. 1765-1772.

Masayuki Ida, JAVA: the Status Quo and the Perspective, IPSJ Study Report, Digital Document, Information Processing Society of Japan, 96-DD-1-2, vol. 96, No. 54, May 27, 1996, pp. 7-14.

Nov. 9, 2010 Japanese Official Action in Japanese Patent Appln. No. 2008-150490.

Feb. 10, 2011 European Search Report in European Patent Appln. No. 10183749.0.

Takumi Yamaguchi, Basics of the Internet "Basics of Java Language", Java Magazine, Japan, Kohgakusha Co., Ltd., Jun. 1, 1996, No. 1, pp. 22-23.

Mar. 22, 2011 Japanese Official Action in Japanese Patent Appln. No. 2010-251896.

May 15, 2012 European Search Report in European Patent Appln. No. 10 183 749.0.

May 18, 2012 European Search Report in European Patent Appln. No. 09 169 285.5.

\* cited by examiner

IMAGE FORMING APPARATUS, METHOD OF CONTROLLING IMAGE FORMING APPARATUS, AND MEMORY MEDIUM FOR STORING COMPUTER PROGRAM FOR EXECUTING METHOD, WITH INTERPRETER FOR CONTROL PROGRAMS THAT ARE PROVIDED FOR EXECUTION ON OS-INDEPENDENT PLATFORM

This application is a division of application Ser. No. 11/768,389 filed Jun. 26, 2007,U.S. Pat. No. 7,633,643 B2, which is a division of application Ser. No. 10/727,621 filed Dec. 5, 2003, U.S. Pat. No. 7,259,883 B2, which is a division of application Ser. No. 09/274,334 filed Mar. 23, 1999,U.S. Pat. No. 6,747,753 B1.

BACKGROUND OF THE INVENTION

1. Field of the Invention

The invention relates to an image processing apparatus having an image processing unit to perform image processes and to a control method of such an image processing apparatus. The invention also relates to a storage medium in which a control program for such an image processing apparatus has been stored.

2. Related Background Art

Hitherto, OA (Office Automation) apparatuses such as a copying machine, facsimile, printer, image scanner, image file system, telephone with an advanced function, and the like have widely been used.

Hitherto, most of those OA apparatuses are not connected to a network but have provided functions while being limited in sole equipment. In recent years, however, those OA apparatuses, used so far in a stand-alone manner, are connected to a network such as an Ethernet or the like and are started to be commonly used by a plurality of computers or the like as clients.

For example, a technique such that a plurality of clients commonly use image processing apparatuses such as a copying machine, facsimile, printer, image scanner, and the like via a network has been put into practical use relatively from early on.

In the conventional technique, however, when the clients use such OA apparatuses via the network, the OA apparatuses need to be always communicated with the clients via the network for a period of time of processes.

For example, when a client program which is executed on a client such a workstation, personal computer, portable information terminal, or the like uses services which are provided by the OA apparatus, a processing request and data necessary for processes are transmitted to a server program that is executed on the OA apparatus in accordance with a predetermined protocol, for example, a network protocol such as LPR, PAP, or the like. Thus, the client controls the operation of a target OA apparatus.

Further, the client program receives a response and necessary data from the server program in accordance with the necessity. The client discriminates the contents of the response from the OA apparatus and transmits a new instruction request to the OA apparatus in accordance with them.

Such a server client system is installed in various network protocols such as TCP/IP and the like and is used. However, it is necessary to continue an interactive communication between the server and the client while a service is being provided.

On the other hand, in the field of a distributive calculation purely comprising computers, in recent years, its technique has been developed from the technique such as a remote procedure call in which the distributive calculation is performed by repeating the interactive communication by a protocol to the technique called a mobile agent in which the executable program object itself moves on a network and executes the distributive calculation. Various techniques have been proposed.

As examples of realizing the distributive calculation system by the mobile agent, various systems such as "Telescript" of General Magic Co., Ltd. of U.S. Pat. No. 5,603,031 and "Aglets" of IBM Tokyo Basic Laboratory have been well known.

The mobile agent comprises a command train and data necessary to execute them and is not limited to one certain execution environment but moves from a certain execution environment to another execution environment and is executed on a dedicated interpreter.

However, the above conventional techniques have the following problems.

First, in the client server system, for the server process, a client process frequently performs the request of a service and the transmission of the data necessary for processes of the service. While controlling a physical mechanism of the OA apparatus corresponding to the request, the server process frequently performs a response to the client process and the return transmission of a processing result in accordance with the necessity. Moreover, as the service to be requested becomes finer, the interactive communication between the client process and the server process has to be repeated many times in accordance with it.

Importance has recently been made to a request such that the service which is provided by the OA apparatus is finely controlled from the client. However, if it is intended to meet this request by the interactive communication of information by the conventional control protocol, traffic of the network increases due to it. Therefore, the user has to use an expensive network infrastructure of higher performance and it is economically disadvantageous.

Second, if the interactive communication by the control protocol is continuously maintained between the client process and the server process, the OA apparatus has to execute in parallel both of the control of the physical mechanism to provide the service and the interactive communication by the network communication. A burden on the OA apparatus due to it is large. In the case where the OA apparatus is a multi-client type apparatus which provides services to a plurality of clients, particularly, such a burden is large.

That is, to maintain the connection of the communication via the network while controlling the physical mechanism which the apparatus has in order to provide the service, a processor of higher performance is necessary as a processor of the apparatus. A memory of a larger capacity is also needed. This becomes a cause of an increase in costs of the apparatus main body.

Third, according to the method of using the communication protocol in order to perform a series of interactive processes for controlling the OA apparatus, a command system to control the apparatus has to be previously designed and installed as a command protocol. Therefore, in the future, when a new using method of the apparatus is expanded, in order to realize such a new using method, the command protocol also has to be expanded.

Thus, both of the client process and the server process have to be changed (version-up of the program) so as to correspond to the expanded command protocol. This results in a troublesomeness for the user and, particularly, since the program of the server process built in the conventional OA apparatus is generally called firmware and is stored in a non-volatile memory or the like, much costs are required to update the program or, in many cases, the updating of the program is exactly impossible. Therefore, expandability of the service that is provided by the OA apparatus decreases.

Fourth, the mobile agent proposed recently in the field of the distributive calculation is a method of a distributive programming on the computer. Therefore, in the mere mobile agent proposed in the field of the distributive calculation, it is impossible to perfectly satisfy the foregoing recent various requirements requested for the conventional OA apparatuses. Particularly, the mobile agent in such a field intends to distributively perform the calculation to solve a certain problem and does not aim to control another computer from a remote location.

Although the above requirements can be satisfied to a certain extent by installing the mobile agent to the server computer to exclusively perform the control of the OA apparatus such as represented by the print server under an execution environment, a network or a communication infrastructure in place of it is still necessary between the server computer and the OA apparatus.

Therefore, there is still a problem of a traffic on the communication medium and a burden of an interface process on the OA apparatus side is also not reduced. Further, if the communication between the OA apparatus and the server computer to exclusively perform the control of the OA apparatus is executed in accordance with the conventional interactive protocol, expandability of the service that is provided by the OA apparatus itself also decreases in a manner similar to the third problem. Since the user has to newly prepare the dedicated server computer for the apparatus, it is disadvantageous from an economical viewpoint and in consideration of the installing area.

SUMMARY OF THE INVENTION

To solve the above problems, according to the invention, the client can provide a desired image processing service while minimizing a connection time that is required to connect to the client and an interactive communication with the client. According to the invention, excellent expandability of an image process can be obtained without being limited to firmware of an image processing apparatus.

To solve the above problems, therefore, according to the invention, there is provided an image processing apparatus for receiving an agent including an operation train through a network and allowing an image processing unit to perform image processes, comprising: control means for controlling the image processing unit; interpreting means for interpreting the operation train of the agent; and message output means for outputting a message to the control means in response to the operation interpreted by the interpreting means.

BRIEF DESCRIPTION OF THE DRAWINGS

The accompanying drawings, which are incorporated in and constitute a part of the specification, illustrate embodiments of the invention, and together with the description, serve to explain the principles of the invention.

DETAILED DESCRIPTION OF THE PREFERRED EMBODIMENTS

Preferred embodiments of the present invention will be described in detail in accordance with the accompanying drawings.

Figure 1:
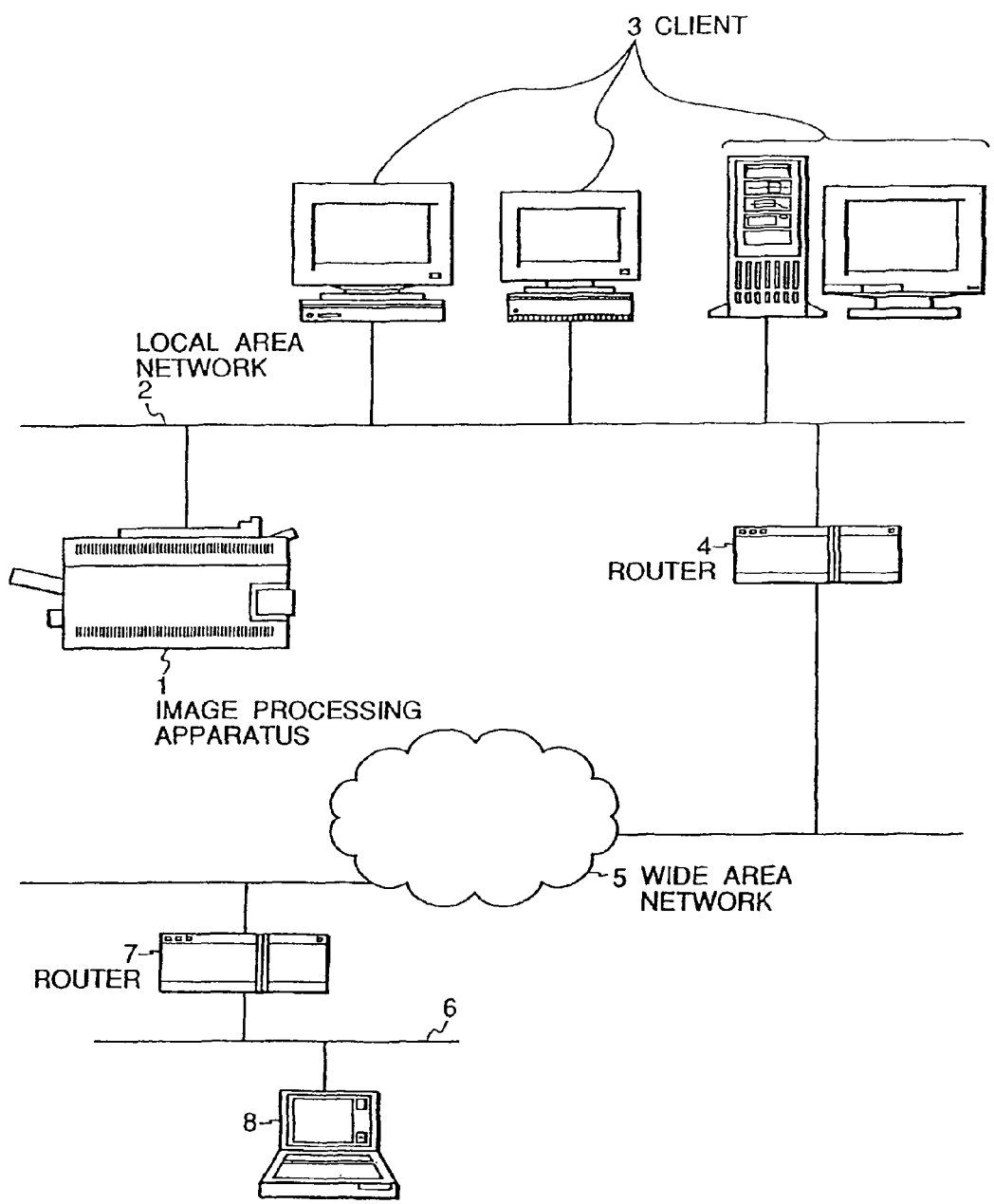
FIG. 1 is a block diagram for explaining a construction of a network system to which the invention can be applied.

FIG. 1 is a diagram showing a construction of an office system including an image processing apparatus as an OA apparatus to which the invention can be applied. In FIG. 1, reference numeral 1 denotes an image processing apparatus. As examples of the image processing apparatus, a copying machine, a facsimile, a printer, an image scanner, a hybrid apparatus thereof, and the like can be mentioned.

Reference numeral 2 denotes a local area network (hereinafter, referred to as an LAN) constructed by the Ethernet or the like. The LAN 2 enables a mutual communication between the apparatuses or between the client and the apparatus. Reference numeral 3 denotes client information processing apparatuses such as a personal computer, workstation, word processor, and the like. Generally, the client information processing apparatus has input devices such as a keyboard, mouse, and the like which are used when the user inputs and output apparatuses such as a display and the like to output information to the user and is connected to the LAN 2.

Reference numeral 4 denotes a router for connecting the LAN 2 to another network and enabling a communication to be performed between apparatuses connected to those networks. In case of TCP/IP, the router 4 usually provides a function to mutually transfer a data frame between the networks having different network addresses.

Reference numeral 5 denotes a wide area network (WAN) such as an internet or intranet. The WAN 5 mutually connects various LANs by an enterprise dedicated network to mutually connect a number of networks, an internet, a virtual private network on the internet, or the like.

Reference numeral 6 denotes a second LAN that is mutually connected to the first LAN via the WAN 5; 7 a second router to connect the LAN 6 and WAN 5; and 8 a remote client connected to the LAN 6. The remote client 8 can be connected to the apparatus 1 from a remote location via the WAN 5.

Figure 2:
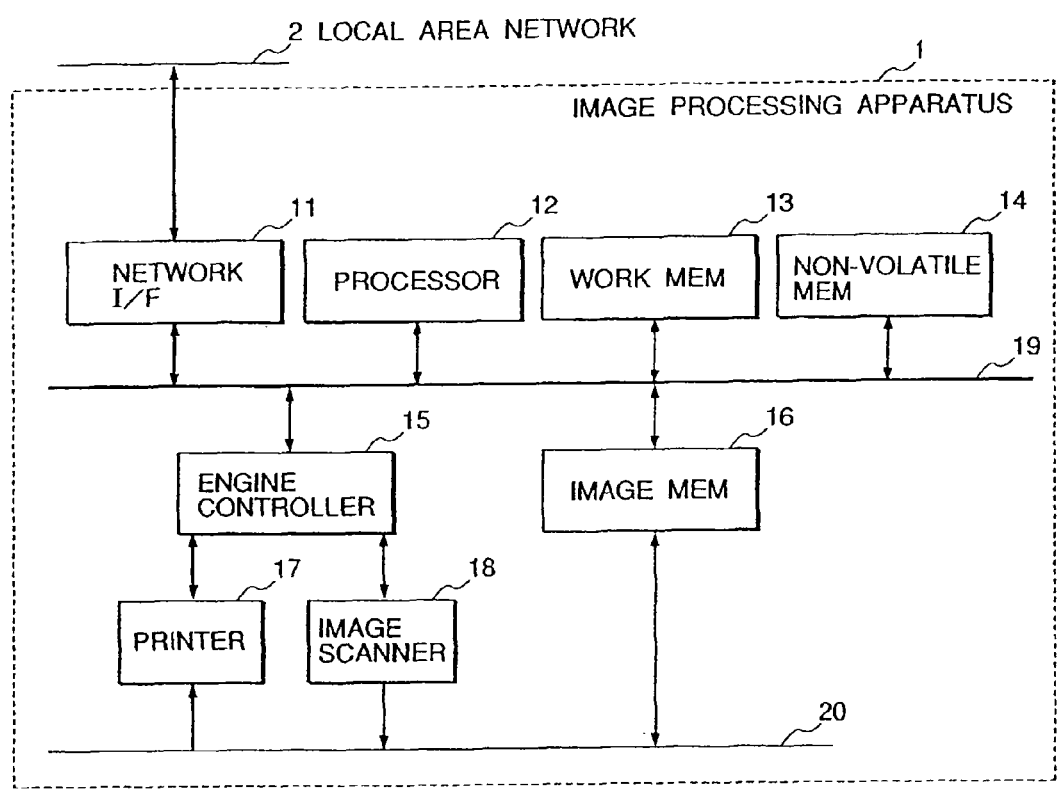
FIG. 2 is a block diagram showing a construction of an image processing apparatus in FIG. 1.

FIG. 2 is a block diagram showing a functional structure of the image processing apparatus 1 in FIG. 1. In FIG. 2, reference numeral 11 denotes a network interface to transmit and receive data frames to/from the LAN 2. The network I/F 11 is constructed by an Ethernet interface or the like. Reference numeral 12 denotes a processor (CPU, MPU) to perform various arithmetic operating processes; and 13 a work memory to store a program which is executed by the processor and data regarding the execution.

Reference numeral 14 denotes a non-volatile memory (constructed by any one of an ROM, a flash ROM, an NVRAM, an HDD, and the like (not shown) or some of them) to store the program which is executed by the processor, initial values of the data regarding the execution of the program, data necessary to be also saved even after the turn-off of a power source, and the like.

Reference numeral 15 denotes an engine controller to control an image processing engine (in the diagram, a printer 17 and an image scanner 18) to perform image processes by hardware; 16 an image memory to store image data; 17 the printer to form an image corresponding to the image data onto a transfer paper; 18 the image scanner to read an image from an original and form image data; and 19 a processor bus to mutually connect the network I/F 11, processor 12, work memory 13, non-volatile memory 14, engine controller 15, and image memory 16 and execute the transmission and reception of data, control information, status of the engine, and the like. Reference numeral 20 denotes an image bus to mutually connect the engine controller 15, image memory 16, printer 17, and image scanner 18 and performs the transmission and reception of the image data.

Figure 3:
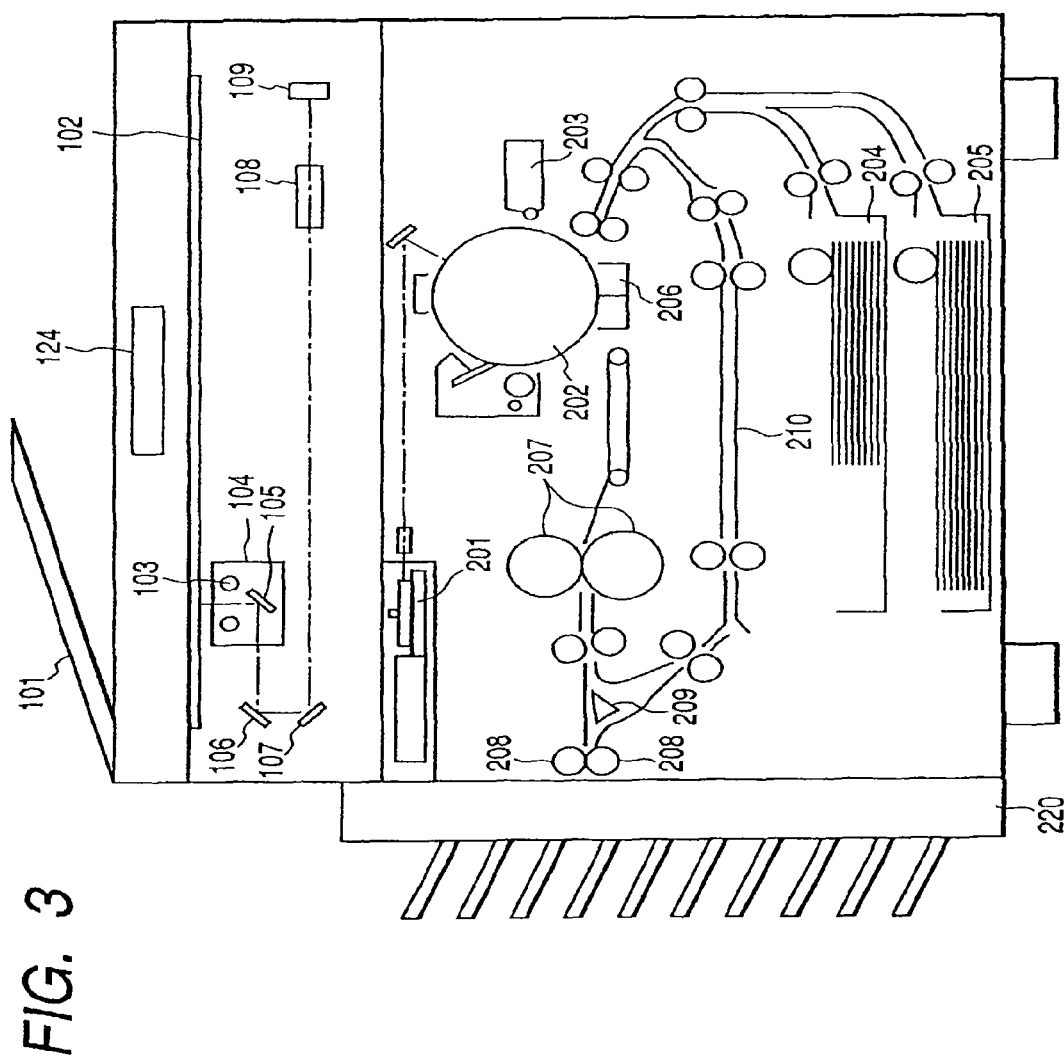
FIG. 3 is a schematic cross sectional view showing a construction of a printer and a scanner in FIG. 2.

FIG. 3 shows an internal structure of the image processing apparatus 1 in FIG. 1. It is assumed that although the image recording engine can be based on various recording systems, it is the image recording engine of an electrophotographic system here.

In FIG. 3, reference numeral 101 denotes a document feeder to sequentially convey originals stacked on a copyboard (original supporting base plate) one by one onto the surface of a copyboard glass 102. When the original is conveyed, a lamp 103 of an image scanner unit is lit on and a scanner unit 104 is moved and irradiates the original. Reflection light of the original passes through mirrors 105, 106, and 107 and a lens 108 and, after that, enters a CCD image sensor 109.

A signal inputted to a printer unit is converted to a photosignal by an exposure controller 201. The photosignal irradiates a photosensitive drum 202 in accordance with an image signal. A latent image formed on the photosensitive drum 202 by the irradiation light is developed to a toner image by a developer 203. The transfer paper is conveyed from a paper tray 204 or 205 in accordance with the development timing. In a transfer unit 206, the developed image is transferred onto the transfer paper. After the transferred image was fixed onto the transfer paper by a fixing unit 207, the transfer paper is ejected to the outside of the apparatus from a paper ejector 208. The transfer paper ejected from the paper ejector is conveyed to each bin in the case where a sorting function by a sorter 220 operates and is conveyed to a top non-sort bin of the sorter when the sorting function does not operate. The engine controller 15 in FIG. 2 is mounted onto a control section 124.

Figure 4:
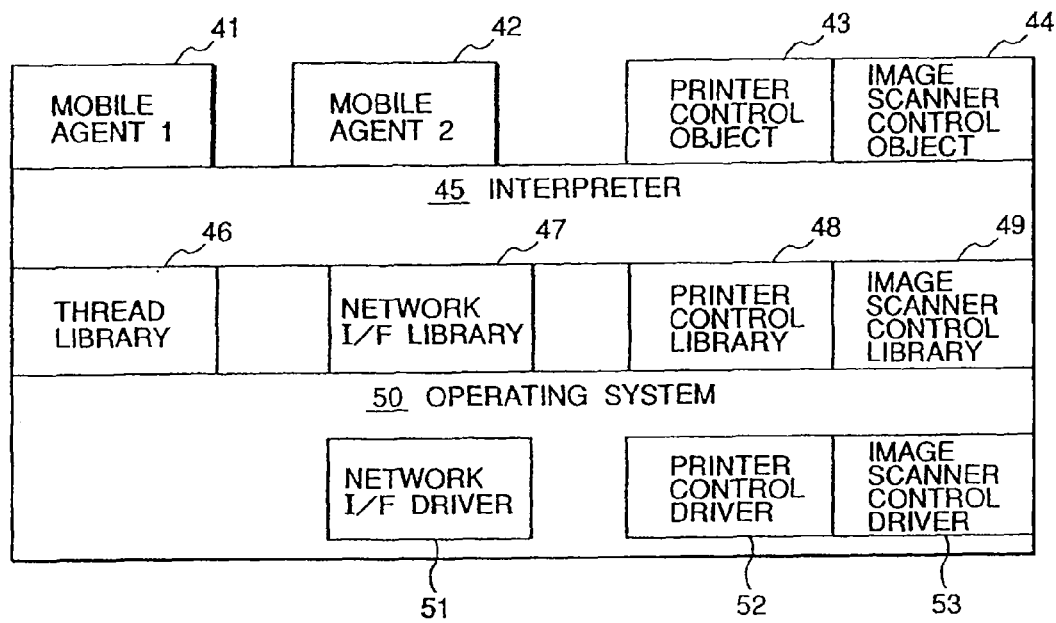
FIG. 4 is a layer diagram showing a construction of software that is processed by a processor in FIG. 2.

FIG. 4 is a layer diagram hierarchically showing a software structure which is realized by executing program codes stored in the work memory 13 by using a data structure stored in the work memory 13 by the processor 12 in FIG. 1 (if the non-volatile memory 14 is an ROM or the like, the program codes can exist in only the non-volatile memory 14).

In FIG. 4, each layer can use services which are provided by the lower layers. The lowest layer is an operating system 50 and is a layer to perform a management of an execution context of the program, a memory management, and the like. Three device drivers of a network interface driver 51, a printer control driver 52, and an image scanner control driver 53 are built in the operating system 50 and mutually function in an interlocking relation manner.

The network interface driver 51 controls the network I/F 11. The printer control driver 52 controls the printer 17 via the engine controller 15 and image memory 16. The image scanner control driver 53 controls the image scanner 18 via the engine controller 15 and image memory 16.

The second lowest layer corresponds to various libraries. The various libraries are statistically or dynamically linked to an interpreter 45, which will be explained hereinlater, and the other application programs and mediate between the operating system 50 and the application program. Among them, a thread library 46 provides a thread function to the programs of the upper layers. A terminology "thread" denotes a unit of parallel processes in the program. Although a plurality of threads in a single process (program under execution) have different execution contexts (program counter, stack, register value, etc.), they commonly use a memory space or the like. The switching of the contexts of the threads is also called a light weight thread because an amount of processes to be executed is smaller than that in case of switching the contexts of the process.

A network interface library 47 is a library to provide a transmitting and receiving function of data in the network by using the network interface driver 51. A printer control library 48 is a library to provide a printer control API (application programming interface) by using the printer control driver. An image scanner control library 49 is a library to provide an image scanner control API by using the image scanner control driver.

The third lowest layer is the interpreter 45. The interpreter 45 provides an object execution environment for allowing the object such as a mobile agent to operate. The object in the embodiment is a subset of an object in a well-known object oriented paradigm. That is, the object is a program structure in which a command train and data regarding the execution of the command train are combined.

Each object autonomously exists and the objects operate in parallel while communicating (message passing) with the other objects. Thus, a series of processes is accomplished as a whole. Specifically speaking, the interpreter 45 interprets a command train of a certain object A and generates a message (command) to the other object B in response to the command. When the message (command) is generated to the object B, the interpreter 45 interprets and executes a command train of the object B corresponding to the message (command). The interpreter 45 generates messages (commands) to various lower libraries in accordance with the interpretation of the command train of the object.

The interpreter 45 can actually generate the message (command) as mentioned above or can merely interpret and execute the command train of the other object B corresponding to the command of the object A without actually generating the message. In the invention, in any case, an expression "the operation which is provided by the other object B is accessed" or "message (command) is generated to the other operation B" is used.

There is an object scheduler in the interpreter 45 and it intermittently allocates a processing time of the processor to each object which operates on the interpreter 45. The object scheduler controls so that the processes of the objects are executed virtually in parallel by using the thread library 46.

An object decoder/encoder exists in the interpreter 45. The command train (scripts) of the object stored in the memory in an executable form and the data are encoded by the object encoder in a form such that they can be substantially reconstructed to a bit train that can be transferred through the network.

The decoder decodes the bit train which can be transferred through the network and develops the object into the memory in an executable form. In the encoding and decoding steps, data compressing and decompressing processes can be also included to reduce the traffic on the network. By including the data compressing and decompressing processes, an amount of data which is transferred between the client and the image recording apparatus can be further reduced and it is useful to reduce the traffic on the network. Even when a band of the network is narrow as in the dial-up connection by the modem or TA, a sufficiently practical throughput can be obtained.

Figure 5:
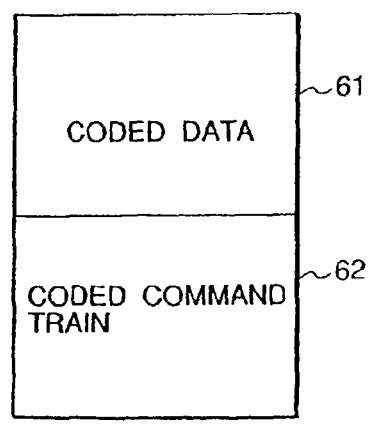
FIG. 5 is an explanatory diagram showing a structure in which a mobile agent in FIG. 4 is coded for network transfer.

FIG. 5 shows an example of a network packet formed by encoding the object. A portion 61 in which the data regarding the execution of the object was encoded and a command train portion 62 of the object are included in the network packet.

The interpreter described here is provided in not only the image processing apparatus 1 but also the clients 3 and 8. Structures and operations of those interpreters are substantially the same while also including the following description.

In FIG. 4, the top layer corresponds to a plurality of objects which are executed on the interpreter. A printer control object 43 provides an operation to control the printer via the printer control library and functions as an alternate object of the printer 17.

For instance, when the operation which is provided by the printer control object 43 in the command train of the object is accessed, the printer control object 43 performs a control corresponding to the relevant operation to the printer 17.

Specifically speaking, the interpreter 45 interprets a command train of a certain object and generates a message to the printer control object 43 if the interpreted operation is an operation that is provided by the printer control object 43. In accordance with the message, the interpreter 45 interprets the command train of the printer control object and controls the printer via the printer control library 48 or the like in response to the interpretation.

Similarly, when the object accesses the operation which is provided by the printer control object 43 and is used to obtain the information of the printer 17, actual status information or the like of the printer 17 can be obtained.

An image scanner control object 44 provides an operation to control the image scanner via the image scanner control library and functions as an alternate object of the image scanner 18.

For example, in the command train of the object, when the operation of the image scanner control object is accessed, the image scanner control object performs a control of the image scanner 18 corresponding to the relevant operation. Similarly, when the object accesses the operation which is provided by the image scanner control object and is used to obtain the information of the image scanner 18, the actual status information or the like of the image scanner 18 can be obtained.

The printer control object 43 and image scanner object 44 are called resident agents here. That is, after the image processing apparatus 1 was activated, the interpreter first automatically forms, initializes, and activates the resident agents. The resident agents exist during the operation of the image processing apparatus 1 (there is an infinite loop in a live operation, which will be explained hereinlater). The resident agents provide various operations to control the printer to the other objects, thereby enabling the other objects to perform various image processes by combining those operations.

In FIG. 4, reference numerals 41 and 42 denote objects to play roles as agents of a certain image process and are called OA mobile agents here. The OA mobile agent is an object having a nature such that it is moved between the client and OA apparatus connected to the network. In the command train, the OA mobile agent accesses the operation (hereinafter, referred to as a "go operation") which denotes "movement".

When the "go operation" is detected during the execution of the interpretation of the command train of the OA mobile agent, the interpreters in the image processing apparatus 1 and clients 3 and 8 in FIG. 1 encode the data of the relevant object and the command train by using the object encoder. In this instance, the interpreter transfers the network packet formed by encoding to an apparatus designated by an argument of the "go operation", for example, to the interpreter of the image processing apparatus 1.

The interpreter 45 of the image processing apparatus 1 receives the transferred packet and decodes the packet by using the object decoder. Thus, the command train of the object and the data are developed into the memory space that is managed by the interpreter 45 and, further, the object becomes a target of scheduling of the object scheduler.

Data showing the location of a command to be executed subsequently to the relevant object is also included in the data of the object. Therefore, in the object, the command that is first executed by the interpreter on the transfer destination side is the command next to the command which was finally executed by the interpreter on the transfer source side.

The mobile agents 41 and 42, consequently, execute the processes described by the command train while moving among the image processing apparatus 1 having the execution environment (interpreter) of the object and the clients 3 and 8 or the like.

In the command train of the object which can be executed by the interpreter 45, an operation defining processes necessary to initialize itself (hereinafter, such an operation is called an "initialize operation") exists. When the object is formed, the interpreter 45 first executes the "initialize operation".

In the command trains of the mobile agents 41 and 42 or resident agents 43 and 44, there is an operation defining a series of processes which are executed while itself exists (hereinafter, such an operation is called a "live operation"). After the object was initialized, the interpreter executes the "live operation". When the execution of the command train defined in the "live operation" of the object is finished, the interpreter extinguishes the object and releases a whole memory area used for the object.

To enable the OA mobile agent to dialogue with another agent, the mobile agent has to get a reference to a partner agent prior to it. In this operation, in the command train of the object, a dialogue request operation (hereinafter, referred to as a "meet operation") that is provided by the interpreter is accessed. Identification information (ID information) to designate the object of the partner to enter an interactive operation is included in an argument of the "meet operation".

The ID information to designate the object is information showing conditions to specify the object and includes, for example, a unique object identifier, an identifier of a class to which the object belongs, or the like.

When the "meet operation" is successfully completed, the mobile agent can obtain the reference to the partner agent. By using it, the operation of the partner agent can be executed. That is, an interactive operation of the message can be performed.

For example, in FIG. 4, when the mobile agent 41 or mobile agent 42 moved from the other apparatus meets the printer control object 43 or image scanner object 44 as a resident agent, the public operation can be accessed by accessing to the open data of the partner agent.

Therefore, the mobile agent 41 or 42 formed in the client 3 in FIG. 1 moves to the image processing apparatus 1 and can directly make a dialogue with the printer control object 43 or image scanner control object 44 of the image processing apparatus 1 without using the network. Thus, the OA mobile agent can execute a desired process, namely, an image reading by the scanner or an image recording by the image processing apparatus 1. The user can allow the image processing apparatus 1 to execute various image processes by freely forming an OA mobile agent in the client 3. Particularly, although the image processing function installed in the image processing apparatus is relatively fixed in the conventional technique, according to the embodiment, the image processing function installed in the image processing apparatus 1 is expanded by forming the OA mobile agent.

The operation of the invention will now be described hereinbelow with reference to flowcharts of FIG. 6 and subsequent diagrams. The image recording will be described as an example hereinbelow. However, it will be obviously understood that the processes such as an image reading by the scanner and the like can be also executed by a similar control.

Figure 6:
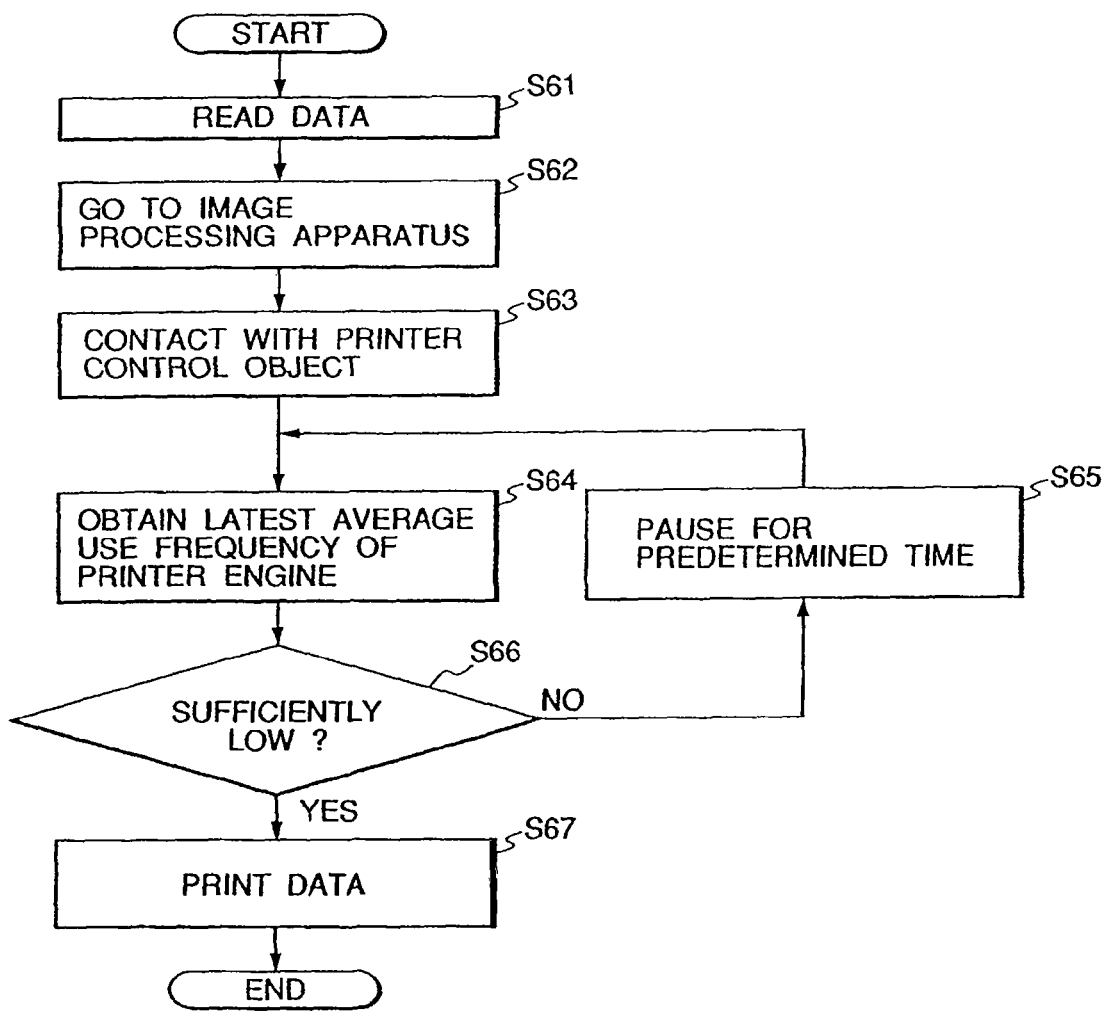
FIG. 6 is a flowchart showing the first processing procedure which is executed by a command train of the mobile agent of the invention.

First, FIG. 6 is a flowchart showing a processing procedure of the OA mobile agent in the case where the image recording is performed by using the OA mobile agent according to the embodiment when a use frequency is low.

First in step S61, the OA mobile agent formed by the client 3 opens a file which should be printed and was designated by the user from the local file system of the client and stores it as own data.

In subsequent step S62, the image processing apparatus 1 is set to a destination and the OA mobile agent moves to the interpreter on the image processing apparatus by the "go operation". In this instance, the command train of the OA mobile agent and the data to be printed are encoded as shown in FIG. 5 and transferred to the image processing apparatus. When the movement of the OA mobile agent is completed, the interpreter on the client 3 deletes the OA mobile agent object from an internal table and releases resources such as a memory space and the like used by the object.

In step S63, the OA mobile agent moved to the image processing apparatus 1 is decoded by the interpreter 45 of the image processing apparatus 1 and the processes are started. The OA mobile agent requests the interpreter 45 to make a dialogue with the printer control object which is resident in the image processing apparatus 1.

In step S64, an average use frequency getting operation that is provided by the printer control object 44 is accessed, thereby obtaining the latest average use frequency of the printer engine.

In step S66, a result of the latest average use frequency is compared with a predetermined use frequency, thereby discriminating whether the latest use frequency is sufficiently low or not. For example, if the obtained average use frequency of latest one hour is equal to a few times/hour and a constant of a threshold value embedded in the command train is equal to 0.5 time/hour, this discrimination result is false and step S65 follows.

In step S65, the execution is paused for a waiting time (for example, 30 minutes) embedded in the command train by "sleep" as a built-in operation. After the elapse of the execution pause time, the execution of the command train is restarted and the processing routine is returned to step S64. The getting and discrimination of the latest average use frequency are re-executed.

In the discrimination in step S66, for example, if the average use frequency of latest one hour is equal to zero time and the constant of the threshold value embedded in the command train is equal to 0.5 time/hour, this discrimination result is true and step S67 follows.

In step S67, a print request operation of the printer control object 44 is accessed by using the print data (stored by the client 3) stored as data of the mobile agent in step S62 as an argument. Thus, the process by the print request operation of the printer control object is executed by the printer 17 and the print data is printed. Although the print data has an arbitrary format, for instance, a PDL such as PostScript or LIPS is considered.

When the process in step S67 is completed, the "live operation" is finished, the interpreter 45 deletes the mobile agent object from the internal table and releases the resources such as a memory space and the like used by the object.

As mentioned above, by transmitting the print data and the OA mobile agent which substitutes its printing process to the image processing apparatus 1, the client 3 can print after that without directly performing an interactive operation to the image processing apparatus 1. Moreover, according to the processes shown in FIG. 6, a fine process which needs the discrimination based on the status of the image processing apparatus such that the print data of a low priority is automatically printed for a period of time during which the image processing apparatus 1 is free is easily realized and the communication between the client 3 and image processing apparatus 1 is never necessary during this process.

Figure 7:
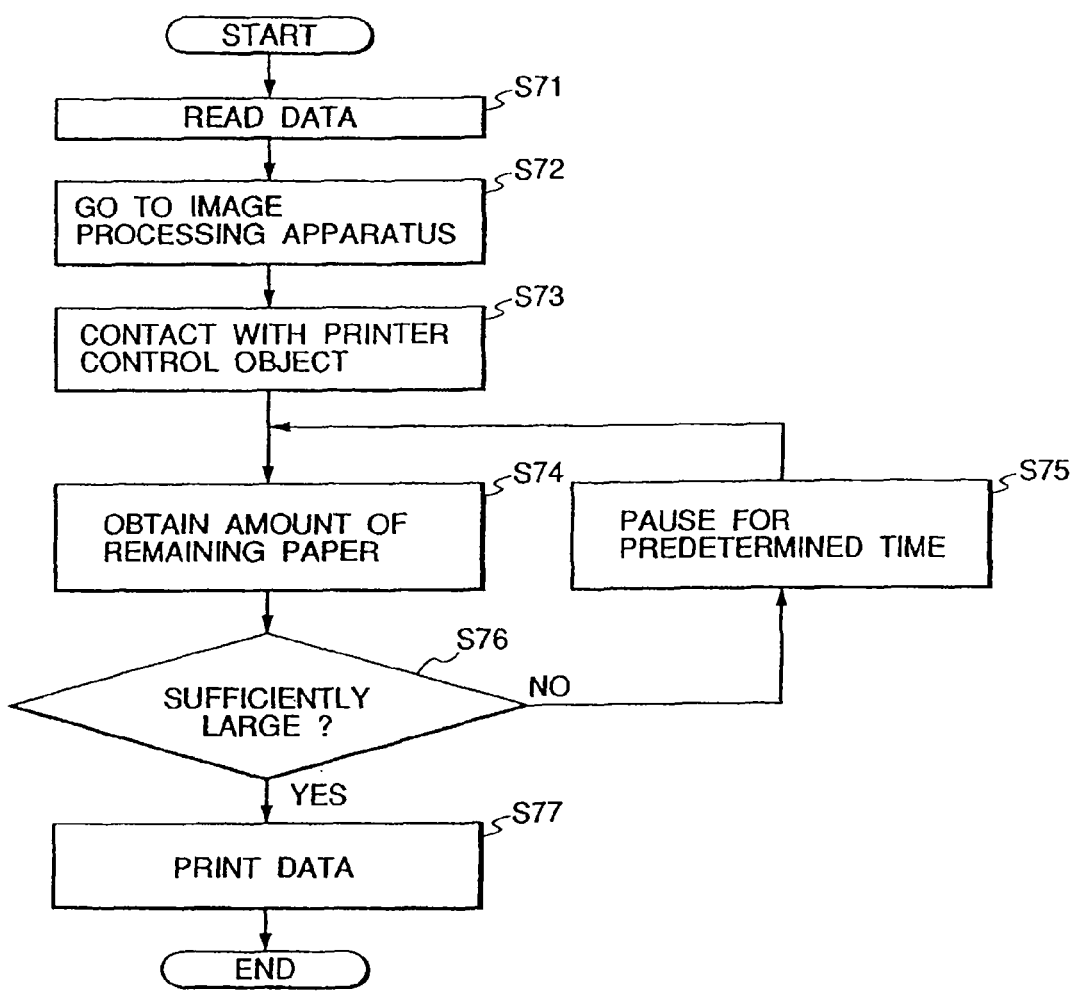
FIG. 7 is a flowchart showing the second processing procedure which is executed by a command train of the mobile agent of the invention.

Subsequently, FIG. 7 is a flowchart showing a processing procedure of the OA mobile agent in the case where the image recording is performed by using the OA mobile agent according to the embodiment when there are an enough amount of papers.

First in step S71, the OA mobile agent formed by the client 3 opens a file which should be printed and was designated by the user from the local file system of the client and stores it as own data.

Subsequently in step S72, the image processing apparatus 1 is set to a destination and the OA mobile agent moves to the interpreter on the image processing apparatus by the "go operation". In this instance, the command train of the OA mobile agent and the data to be printed are encoded as shown in FIG. 5 and transferred to the image processing apparatus. When the movement of the OA mobile agent is completed, the interpreter on the client 3 deletes the OA mobile agent object from the internal table and releases the resources such as a memory space and the like used by the object.

In step S73, the OA mobile agent moved to the image processing apparatus 1 is decoded by the interpreter 45 of the image processing apparatus 1 and the processes are started. The OA mobile agent requests the interpreter 45 to perform an interactive operation to the printer control object which is resident in the image processing apparatus 1.

In step S74, a remaining amount of the print papers is calculated by using the operation that is provided by the printer control object. In step S76, a check is made to see if an amount of papers is sufficient to print. If there is an enough paper amount (YES in step S76), a printing process is performed in step S77.

If the amount of papers is insufficient to print (NO in step S76), in step S65, the execution is paused for the waiting time (for example, 30 minutes) embedded in the command train by "sleep" as a built-in operation. After the elapse of the execution pause time, the execution of the command train is restarted and the processing routine is returned to step S74.

As shown in the processes of FIG. 7, the client 3 transmits the print data and the OA mobile agent which substitutes its process to the image processing apparatus 1, so that the print data can be automatically printed after that without an interactive operation between the client 3 and image processing apparatus 1 by waiting until an enough amount of papers are supplemented to the printer.

Figure 8:
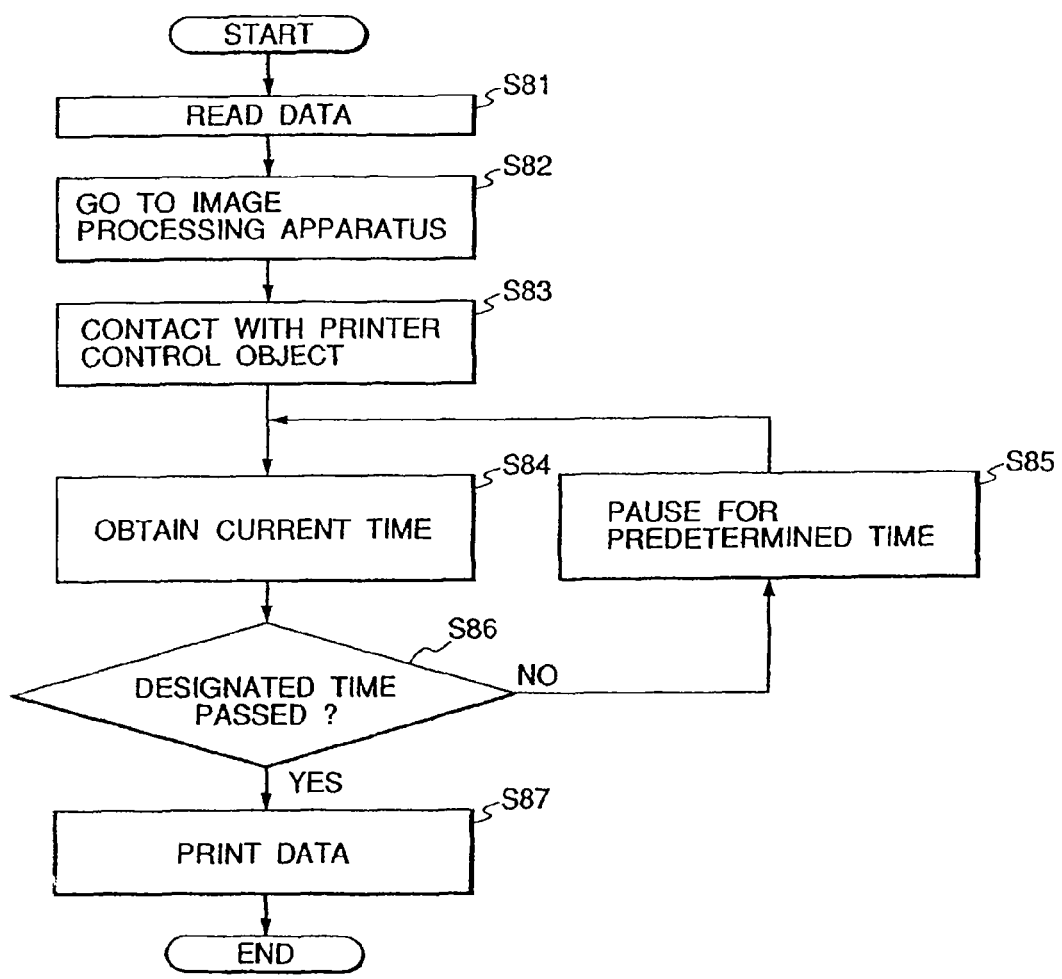
FIG. 8 is a flowchart showing the third processing procedure which is executed by a command train of the mobile agent of the invention.

FIG. 8 is a flowchart showing a processing procedure of the OA mobile agent in the case where a recording output is performed at a designated time by using the OA mobile agent according to the embodiment. Since steps S81 to S83 are similar to steps S61 to S63 in FIG. 6, their descriptions are omitted.

In step S84, the current time is obtained from a timer circuit (not shown) in the image processing apparatus 1. In step S86, the OA mobile agent discriminates whether the print time designated by the command train has elapsed or not. If it elapses (YES in step S86), the printing process is performed in step S87. The print time is designated by the user by the printing operation from the client 3.

As shown in processes in FIG. 8, the client 3 transmits the print data and the mobile agent which substitutes its process to the image processing apparatus 1, so that a large amount of print data, for example, can be automatically printed at midnight after that without an interactive operation between the client 3 and image processing apparatus 1.

Figure 9:
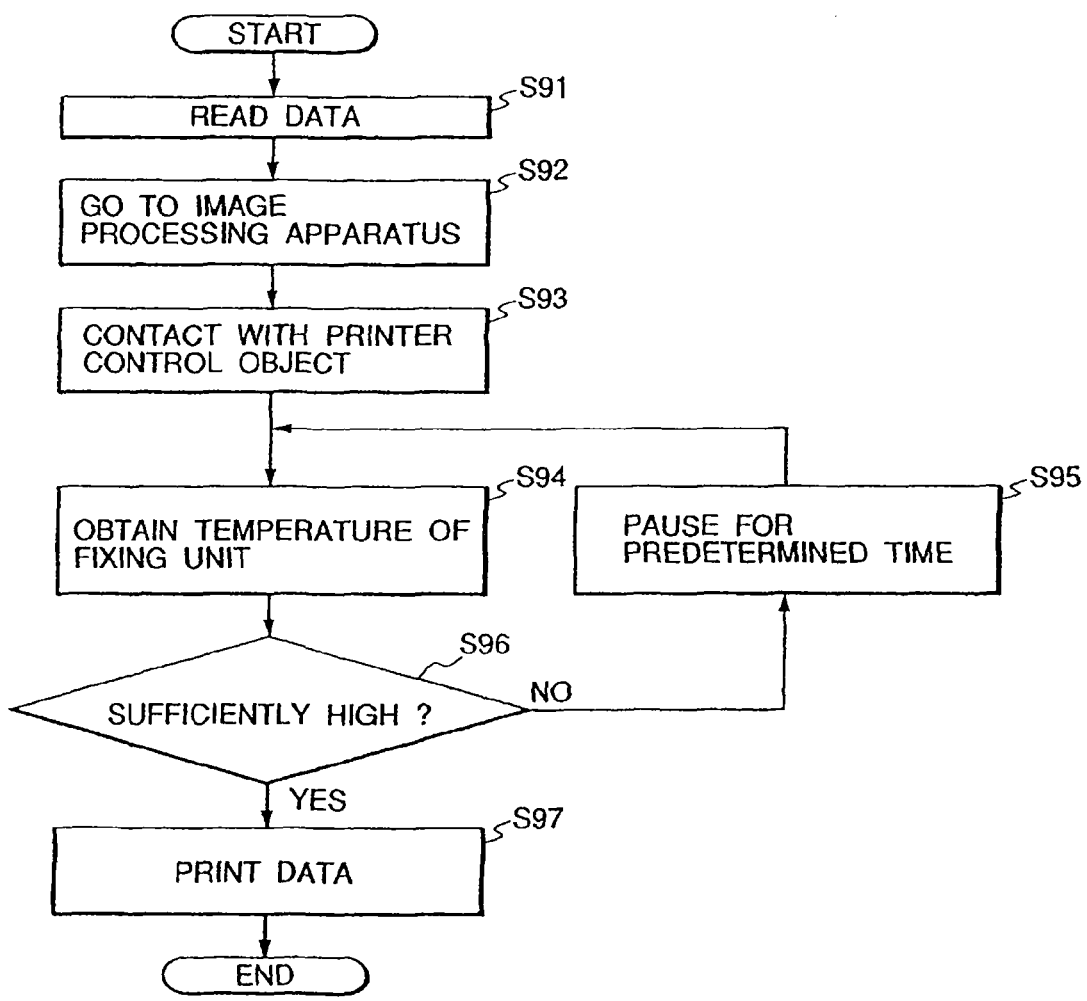
FIG. 9 is a flowchart showing the fourth processing procedure which is executed by a command train of the mobile agent of the invention.

FIG. 9 is a flowchart showing a processing procedure of the OA mobile agent in the case where a recording output is performed by using the OA mobile agent according to the embodiment when a fixing temperature of the printer engine of the image processing apparatus 1 becomes an enough value. Since steps S91 to S93 are similar to steps S61 to S63 in FIG. 6, their descriptions are omitted.

In step S94, a current temperature of the fixing unit 207 (FIG. 3) is obtained. In step S96, whether the temperature of the fixing unit 207 exceeds a temperature designated by the command train or not is discriminated. If the fixing temperature is sufficiently high (YES in step S96), the printing process is performed.

If the fixing temperature is insufficient (NO in step S96), in step S95, the execution is paused for the waiting time (for example, 30 minutes) embedded in the command train by "sleep" as a built-in operation. After the elapse of the execution pause time, the processing routine is returned to step S94 to restart the execution of the command train.

As shown in the processes of FIG. 9, the client 3 transmits the print data and the OA mobile agent which substitutes its process to the image processing apparatus 1, so that the print data can be automatically printed after that without an interactive operation between the client 3 and image processing apparatus 1, for example, by waiting until a preparation of the apparatus is completed upon activation of the apparatus.

The invention can be applied to a system constructed by a plurality of equipment (for example, a host computer, interface equipment, a reader, a printer, etc.) or can be also applied to an apparatus comprising one equipment (for instance, a copying machine, a facsimile apparatus, or the like).

Figure 10:
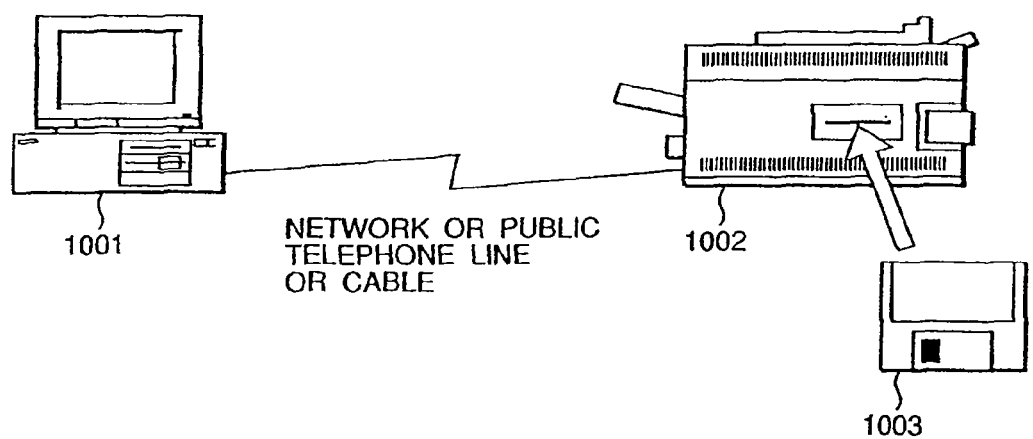
FIG. 10 is a diagram showing an example of a method of supplying a control program to the image processing apparatus.

As shown in FIG. 10, it will be obviously understood that the object of the invention is accomplished by a method whereby a storage medium 1003 in which program codes of software to realize the functions of the embodiments mentioned above have been recorded is supplied to an OA apparatus 1002 and a computer (or a CPU or an MPU) of the OA apparatus reads out and executes the program codes stored in the storage medium.

As shown in FIG. 10, the object of the invention can be also accomplished by a method whereby the program codes of the software to realize the functions of the embodiments mentioned above are supplied from a server computer 1001 to the OA apparatus 1002 via a network, a public telephone line, or a cable and the computer (or a CPU or an MPU) of the OA apparatus 1002 executes the supplied program codes.

In this case, the program codes themselves read out from the storage medium realize the functions of the embodiments mentioned above and the storage medium in which the program codes have been stored and a server apparatus which transmitted the program codes construct the invention.

Although the embodiments have been shown with respect to an example in which the present program and associated data are directly loaded from the storage medium into the RAM and are executed, it is also possible to use another method whereby the present program and associated data are once stored (installed) from an external storage medium such as an FD or the like to a hard disk as a non-volatile storage medium in an external memory and, when a control program for the data forming and transmitting processes is made operative, they are loaded from the hard disk to the RAM.

As a storage medium to supply the program codes, for instance, any one of a floppy disk, a hard disk, an optical disk, a magnetooptical disk, a CD-ROM, a CD-R, a magnetic tape, a non-volatile memory card, an ROM, and the like can be used. It will be also obviously understood that the invention includes not only a case where the functions of the embodiments mentioned above are realized by executing the read-out program codes by the computer but also a case where the OS (operating system) or the like which operates on the computer executes a part or all of the actual processes on the basis of instructions of the program codes and the functions of the embodiments mentioned above are realized by those processes.

Further, the invention also incorporates a case where the program codes read out from the storage medium are written into a memory provided in a function expanding board inserted in a computer or a function expanding unit connected to the computer and, after that, a CPU or the like provided for the function expanding board or function expanding unit executes a part or all of the actual processes on the basis of instructions of the program codes, and the functions of the embodiments mentioned above are realized by those processes.

As described above, according to the embodiments, the client 3 transmits the print data and the mobile agent which substitutes its process to the image processing apparatus 1, so that the fine processes which need the discrimination based on the status of the image processing apparatus can be easily performed after that without an interactive operation between the client 3 and image processing apparatus 1.

As processes by the discrimination based on the status of the image processing apparatus 1, "the processes are performed when the use frequency of the image processing apparatus is low" (FIG. 6), "the processes are performed when an amount of papers is sufficient" (FIG. 7), and "the processes are performed when the designated print time comes" (FIG. 8), and "the processes are performed when the temperature of the fixing unit 207 is higher than the designated temperature" (FIG. 9) have been shown. However, the control that can be executed by the OA mobile agent in the OA apparatus on the movement destination side is not limited to the foregoing control.

For example, as another method, upon execution of the OA mobile agent, it is possible to take a dynamic countermeasure such that by referring to version information or the like of the interpreter of the image recording apparatus or the printer control object, the printer engine is controlled by a different method in accordance with each version. That is, desired various controls can be performed by the OA mobile agent and it shows high expandability of the printer function.

Although the image recording has been described above as an example, the process such as an image reading by the scanner or the like can be also obviously executed by a similar control. In this case, the OA mobile agent moved from the client allows the scanner control object to perform the image reading operation by the scanner by the "meet operation" and also enables the read-out image data to be transmitted to the client 3 by the "go operation".

It is also obviously possible to allow the OA mobile agent to perform various converting processes for the image data, for example, arbitrary converting processes such as a zoom of an image, halftone process, conversion of an image file format, and the like besides the recording and reading operations of the image.

Further, in the embodiments, while the OA mobile agent is performing the printing process by the image recording apparatus, there is no need to continue the connection between the client and the image recording apparatus, so that the traffic on the network can be reduced.

The interpreter can execute the recording process without depending on the operating system of the client and the image recording apparatus so long as there is a compatibility between the client and the image recording apparatus.

Moreover, in the conventional technique, although expandability is low because the command train itself to perform the printer control has fixedly been stored in the image recording apparatus, an arbitrary command train can be executed by the OA mobile agent by using the operation or the like which is provided by the interpreter of the image recording apparatus and the resident object.

By referring to the version information or the like of the interpreter of the image recording apparatus and the printer control object, it is possible to take a dynamic countermeasure such that the printer engine is controlled by the method corresponding to each version or the like.

According to the embodiments, the remote client 8 or the like in FIG. 1 can also control the image processing apparatus 1 through the network such as a wide area network or Internet.

Further, even if the client and the image recording apparatus are intermittently connected, the printing process can be sufficiently performed. Therefore, even if the remote client 8 is connected to the image recording apparatus by the dial-up type network connection, the control of the image processing apparatus 1 can be sufficiently and easily performed.

According to the invention as described above, a desired image processing service can be sufficiently and easily executed while minimizing the connection time between the client and the OA apparatus and the interactive communication between the client and the OA apparatus. Further, by transmitting the command train to control the OA apparatus from the client, there are effects such that a flexible control more than that in the conventional system can be performed and the expandability of the OA apparatus increases.

The present invention is not limited to the above embodiments and various changes and modifications can be made within the spirit and scope of the present invention. Therefore, to appraise the public of the scope of the present invention, the following claims are made.

What is claimed is:

1. An image processing apparatus comprising:
   an interpreter unit configured to interpret control programs including a command train;
   a memory unit configured to store predetermined function programs for controlling a function of the image processing apparatus, the function programs being defined as an interface between the control programs and a device driver program for controlling the function and being used commonly by the control programs, the device driver program operating a printer engine; and
   an execution unit configured to execute the device driver program in accordance with the interpretation of the control programs by said interpreter unit,
   wherein, in execution of the device driver program, the execution unit controls the printer engine in a manner based on a version of the interpreter unit.

2. An image processing apparatus according to claim 1, wherein the image processing apparatus has a printing function, a scanning function, or a network interface function,
   wherein the function programs stored by said memory unit include a printer control library which serves as a programming interface for controlling the printing function, a scanner control library which serves as a programming interface for controlling the scanning function, or a network interface library which serves as a programming interface for controlling the network interface function, and
   wherein said execution unit executes at least one of the device driver program for controlling the printing function, the device driver program for controlling the scanning function and the device driver program for controlling the network interface function, by calling at least one of the printer control library, the scanner control library, and the network interface library in accordance with the interpretation of the control programs by said interpreter unit.

3. A control method for controlling an image processing apparatus having a memory unit which stores predetermined function programs for controlling a function of the image processing apparatus, the function programs being defined as an interface between control programs including a command train represented in byte codes and a device driver program for controlling the function and being used commonly by the control programs, said method comprising:
   an interpreting step of interpreting the control programs including a command train; and
   an executing step of executing the device driver program in accordance with the interpretation of the control programs in said interpreting step,
   wherein the device driver program operates a printer engine, and
   wherein, in execution of the device driver program, the executing step controls the printer engine in a manner based on a version of interpretation software used in said interpreting step.

4. A method according to claim 3, wherein the image processing apparatus has a printing function, a scanning function, or a network interface function,
   wherein the function programs stored by the memory unit include a printer control library which serves as a programming interface for controlling the printing function, a scanner control library which serves as a programming interface for controlling the scanning function, or a network interface library which serves as a programming interface for controlling the network interface function, and
   wherein said executing step executes at least one of the device driver program for controlling the printing function, the device driver program for controlling the scanning function and the device driver program for controlling the network interface function, by calling at least one of the printer control library, the scanner control library, and the network interface library in accordance with the interpretation of the control programs in said interpreting step.

5. A non-transitory computer-readable storage medium for storing a computer program which causes a computer to execute a control method for controlling an image processing apparatus, wherein the image processing apparatus has a memory unit which stores predetermined function programs for controlling a function of the image processing apparatus, the function programs being defined as an interface between control programs including a command train represented in byte codes and a device driver program for controlling the function and being used commonly by the control programs, the method comprising:

an interpreting step of interpreting the control programs including a command train; and an executing step of executing the device driver program in accordance with the interpretation of the control programs in said interpreting step, wherein the device driver program operates a printer engine, and wherein, in execution of the device driver program, the executing step controls the printer engine in a manner based on a version of interpretation software used in said interpreting step.

* * * * *

UNITED STATES PATENT AND TRADEMARK OFFICE
CERTIFICATE OF CORRECTION

| | | |
|---|---|---|
| PATENT NO. | : 8,300,253 B2 | |
| APPLICATION NO. | : 12/546736 | |
| DATED | : October 30, 2012 | |
| INVENTOR(S) | : Masahito Yamamoto | |

It is certified that error appears in the above-identified patent and that said Letters Patent is hereby corrected as shown below:

ON THE TITLE PAGE:

At item (73), Assignee:
"Canon Kabushika Kaisha" should read --Canon Kabushiki Kaisha--.

Signed and Sealed this
Twenty-seventh Day of November, 2012

David J. Kappos
*Director of the United States Patent and Trademark Office*